United States Patent Office 3,122,991
Patented Mar. 3, 1964

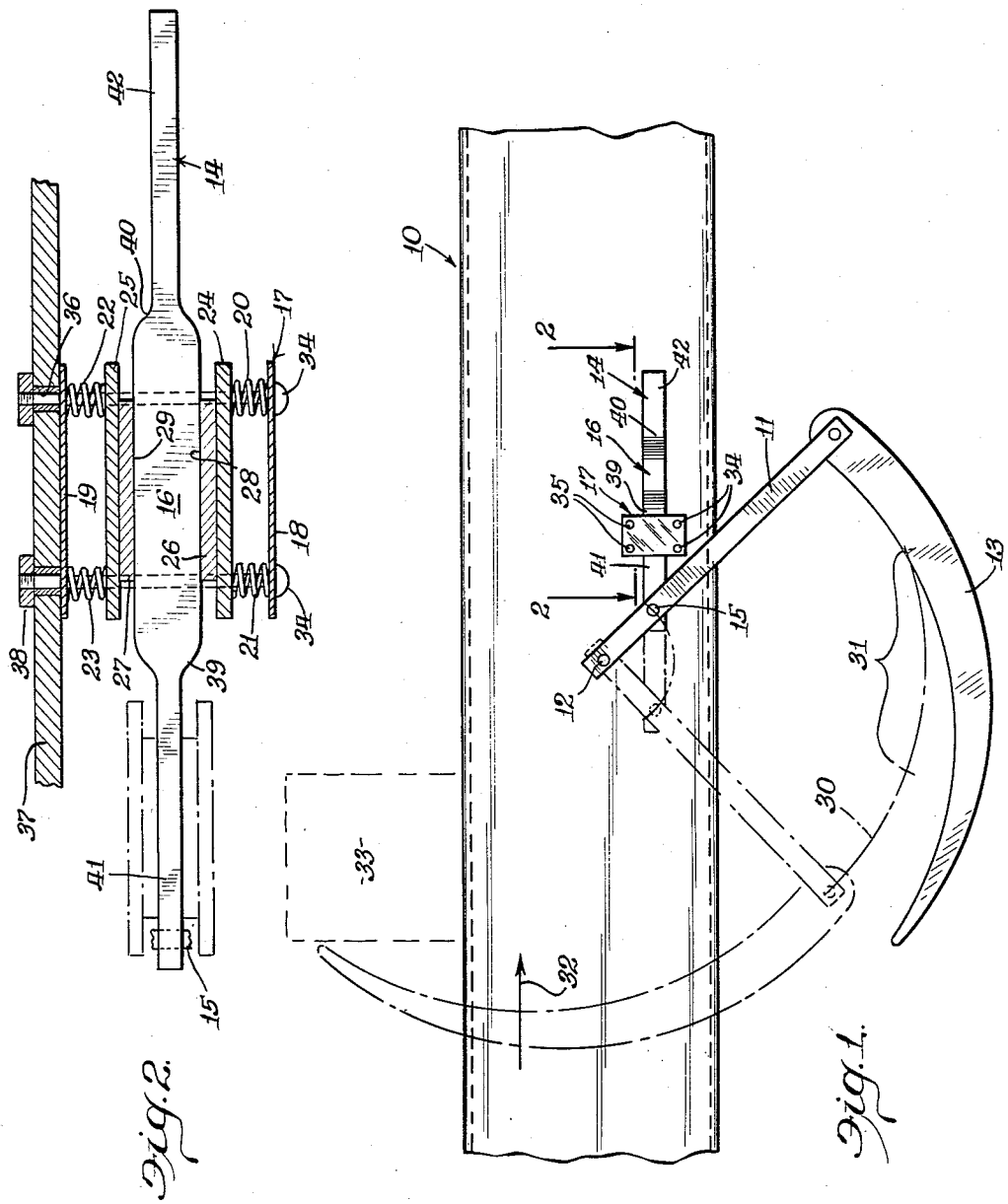

3,122,991
DIFFERENTIAL NEEDLE BRAKE FOR BALERS
Homer N. Grillot, Naperville, Ill., assignor to International Harvester Company, Chicago, Ill., a corporation of New Jersey
Filed Dec. 14, 1961, Ser. No. 159,238
4 Claims. (Cl. 100—19)

This invention relates to a new and improved differential needle brake for balers.

Hay balers employ needles to carry twine or wire strand around newly formed bales to effect a tying of the bales. The bale encircling needles are driven by a suitable source of power such as an engine which is also used to reciprocate a hay compressing plunger. The needles thus must move from a position on one side of a bale forming chamber, through the chamber, and to a knotter or wire twister on the other side of the chamber. The needles remain at rest in a home position on the side of the bale forming chamber away from the knotter or twister during the filling of the bale forming chamber with hay and the compression thereof. When a bale of hay is completed the operating mechanism is tripped causing the needle to be placed into motion. The needle starts from a stationary position and must move rapidly to quickly carry the bale encircling strand to the knotter. In the past, brakes have been employed to retard movement of the needle either at its home position or at its arrival at the knotter. Attention is invited to the patent to Russell R. Raney 2,403,396. This particular Raney device cushions or rather assumes the load of the full momentum of the needles in their home position. However, when the needles are stopped in either of their extreme positions by braking means, the amount of force necessary to start movement either away from home or on return to home is necessarily increased. The overall advantage of such brakes are almost nullified.

It is a principal object of the present invention to provide a brake for baler needles which retards movement of the needles intermediate the ends of the stroke and has a minimum of interference with starting or reversing the direction of movement of the needles.

An important object of the present invention is the provision of a differential brake for baler needles.

Another important object of this invention is to supply a hay baler needle having an arm associated with the drive thereof and including brake means acting to retard movement of the arm.

Still another important object of this invention is to equip an arm movable with a baler needle with varying effective widths whereupon a brake means acting to retard movement of the arm will be more effective at the wider portions of the arm.

Another and still further important object of this invention is to provide a baler with a generally elongated arm movable with the strand carrying needles thereof and the arm having an enlarged central portion whereby when a brake means is applied to the arm, differential effects of braking of the needle are obtained, with the greatest braking effects occurring during the mid-travel of the baler needles.

Still another important object of this invention is the provision of an effective braking means for a baler needle which will avoid shock loads on the needle at either of its extreme positions of movement and yet will readily permit the starting or reversing of direction of the needle.

Other and further important objects and advantages will become apparent from the disclosures in the following specification and accompanying drawings.

In the drawings:

FIGURE 1 is a side elevational view of a portion of a hay baler showing a strand carrying needle and the braking means therefor as employed in this invention.

FIGURE 2 is a top plan view of the needle braking mechanism of FIGURE 1 with portions of the bale forming chamber to which it is attached, broken away and shown in section.

As shown in the drawings:

The reference numeral 10 indicates generally a bale forming chamber. The bale forming chamber of this invention is generally comparable to that shown in the earlier Crumb et al. Patent 2,450,082. The baler of this invention is of the automatic type wherein a single operator may accomplish baling. The baling device is designed so that it will pick up hay from a windrow, deliver the hay to a bale forming chamber, and discharge completely tied bales. The tie strands may be either twine or wire and bale encircling needles are employed to carry the strands around the formed bale in the bale forming chamber and deliver the ends to either knotter or twisting units.

As shown in FIGURE 1 a needle tie pipe 11 is pivotally mounted at 12 on the bale forming chamber 10. A needle 13, used to carry the tie strand, is fixed to the outer end of the needle tie pipe 11. Oscillation of the needle tie pipe about its pivotal mounting 12 causes the needle 13 to move from its home position on the bottom of the bale forming chamber 10 up to the dash line position thereof as shown in FIGURE 1 for delivering a tie strand to a knotter or a wire twister at the upper or far side of the bale forming chamber 10.

An arm 14, which for convenience will be designated a brake arm, is generally elongated in shape and is pivotally mounted at 15 on the needle tie pipe 11. The needle tie pipe 11 is driven by some source of power (not shown) and preferably that same source effects reciprocation of a hay compressing plunger (not shown). The brake arm 14, as previously stated, is relatively elongated and is provided wtih an enlarged central portion 16 at the location of maximum braking of the needle as will hereafter be described. Thus the width of the brake arm 14 varies throughout its length and is relatively narrow at one end, wide in the middle section and narrow again at its other end.

A braking mechanism 17 is utilized to effect a retarding of movement of the brake arm 14 and thus also the needles 13. The braking mechanism 17 includes spaced apart backup plates 18 and 19. Springs 20, 21, 22 and 23 located at each corner of the backup plates 18 and 19 act to urge spaced apart opposing brake shoes 24 and 25 with respective brake linings 26 and 27 against opposite sides of the brake arm 14. Oppositely raised portions 28 and 29 on the brake arm 14 constitute the maximum braking portion 16 of the brake arm 14. It is at the position of this greater width central portion 16 that the springs 20, 21, 22 and 23 are compressed their maximum amount and have maximum braking effect. Similarly the brake shoes 24 and 25 and linings 26 and 27 have their minimum braking effect on the arm when the mechanism 17 is in engagement with either of the narrow ends of the brake arm 14. When the brake shoes are opposite either of the narrow end portions of the arm 14 the springs 20, 21, 22 and 23 are extended to substantially their maximum extent. The springs are of the type that when extended to effect engagement of the shoes with the narrow portion of the arm 14, the force by which the shoes engage the arm is relatively slight; whereas when the springs are substantially compressed, as when the shoes and their brake linings are in engagement with the wide portion 16 of the arm 14, the braking effect is substantially increased by reason of the greater force of application of the brake means 26 and 27 with the brake arm 14.

As best shown in FIGURE 1 the arc of travel of the tie pipe 11 is indicated by the reference numeral 30. The maximum braking portion of the entire arc of travel 30 is indicated at 31 which is substantially the mid-position of the arc of travel. This, of course, is determined by the shape of the elongated brake arm 14. Inasmuch as the maximum braking portion 16 of the arm 14 is located at the mid-position of the arm 14 it follows that the mid-position of the arc of travel of the tie pipe 11 will also be considered the maximum braking portion of the needle travel.

In the operation of the device of this invention, hay is admitted to the bale forming chamber 10 and compressed by means (not shown) in the direction of an arrow 32. When sufficient hay has been delivered to the chamber and compressed to constitute a full length bale, a trip (not shown) causes actuation of the tying mechanism. The actuation of the tying mechanism includes means to cause the needle tie pipe 11 to move about its hinge 12 on the side of the bale forming chamber 10 to thereupon move the needle 13 from its home position of rest as shown in full lines in FIGURE 1 to a position through the bale forming chamber and with its end adjacent the twine knotter or wire twister dependent upon the type of bale encircling strand used in the baler. For convenience the knotter or wire twister has just been shown diagrammatically at 33. The diagrammatic showing is believed proper inasmuch as no claim is being made to any specific knotter or wire twister.

The braking mechanism 17 has been shown in greater detail in FIGURE 2. The braking mechanism is carried on and supported by the bale forming chamber 10 by means of bolts 34 and 35. As shown in FIGURE 2 the bolts 34 pass through openings 36 in the wall 37 of the bale forming chamber 10 and preferably have thin nuts 38 threadedly engaging the inner ends thereof. The nuts act to hold the bolts fixed with respect to the chamber 10 and thus the braking mechanism 17 is also held in fixed position with respect to the side of the forming chamber.

Further, as shown in FIGURE 2, the enlarged central portion 16 of the brake arm 14 is equipped with tapering junction portions 39 and 40 which join narrow outer ends 41 and 42 of the arm 14 with the wide central portion 16. It is thus apparent that the brake arm 14 moves generally in a straight line path as the needle tie pipe 11 is oscillated about its pivotal mounting 12 to carry the needle 13 from one side of the bale forming chamber to the other side without interruption by reason of the inclined surfaces 39 and 40. In other words the brake shoes 24 and 25 and their included brake linings 26 and 27 may readily ride up and down from the wide portion 16 to the narrow ends 41 or 42 by reason of their sliding up or down the inclines 39 and 40.

It should thus be apparent that as the needle tie pipe 11 pulls the arm 14 through the braking mechanism 17 the effectiveness of the brake will depend on the position of the arm within the brake mechanism. Thus at the home position of the needle 13 as shown in FIGURE 1 there is a minimum of resistance to the needle commencing movement upwardly and through the bale forming chamber 10. However, prior to the needle attaining maximum acceleration and running into the knotter or wire twister 33 at the opposite side, the maximum braking effect of the central portion 16 of the arm 14 comes into play thus retarding movement of the needle and causing it to have a relatively slow gliding to its position adjacent the knotter or wire twister 33. Similarly, upon commencing return movement of the needle 13 from its position adjacent the knotter or wire twister the effective braking is at a minimum by reason of the narrow portion 42 of the brake arm 14 being positioned intermediate the brake shoes 24 and 25 and their respective brake linings 26 and 27. Thus in both the positions of starting and reversing the needle there is a minimum of resistance whereas during the middle portion of movement when the needle is building up acceleration the differential brake acts to retard movement of the needle and thereupon slow it down for its arriving either at its home position or at its knotter or wire twister engaging position thus minimizing the shock load on the device at any time during its operation.

I am aware that numerous details of construction may be varied throughout a wide range without departing from the principles disclosed herein and I therefore do not propose limiting the patent granted hereon otherwise than as necessitated by the appended claims.

What is claimed is:

1. A needle brake for a baler, comprising: a bale forming chamber, a needle tie pipe pivotally mounted at one end thereof on said bale forming chamber, a needle mounted on the end of said needle tie pipe away from said pivotal mounting, a brake arm connected adjacent one end thereof to said needle tie pipe, said needle tie pipe being adapted to oscillate and thus impart a generally reciprocal movement to said needle and said brake arm, said brake arm including means for causing during each stroke thereof a variable braking force comprising, in seriatim, a minimum braking force, a maximum braking force, and a minimum braking force, a braking member mounted on said bale forming chamber, said braking member cooperating with said means for causing a variable braking force to produce a braking effect on said brake arm, whereby said variable braking effect is varied during each stroke of the brake arm with the greatest braking effect occurring during the mid-travel of said brake arm and a minimum braking effect occurring during the extremities of its travel.

2. The invention as set forth in claim 1 wherein said brake arm is generally elongated and has various widths and said braking member includes spaced apart brake shoes yieldably mounted and adapted to receive said brake arm sections of varying widths therebetween.

3. The invention as set forth in claim 2 wherein said brake arm has a relatively thick central portion and comparatively thin end portions, said braking member acting in seriatim during each stroke of said arm on one of said thin end portions, then on said thick, central portion, and then on the other of said thin end portions whereby the braking effect is increased during the central portion of the needle travel and decreased at the extremities such that the braking mechanism will not effect reversing the direction of needle travel.

4. The invention as set forth in claim 3 wherein the thick central portion and the thin end portions of the brake arm are joined by inclined portions.

References Cited in the file of this patent

UNITED STATES PATENTS

| | | |
|---|---|---|
| 1,101,993 | Bowen | June 30, 1914 |
| 1,153,531 | Adams | Sept. 14, 1915 |
| 2,766,684 | Newmaster et al. | Oct. 16, 1956 |

FOREIGN PATENTS

| | | |
|---|---|---|
| 1,167,999 | France | Aug. 25, 1958 |